F. HAMACHEK.
DETACHABLE LINK CHAIN.
APPLICATION FILED OCT. 3, 1910.
1,144,411. Patented June 29, 1915.
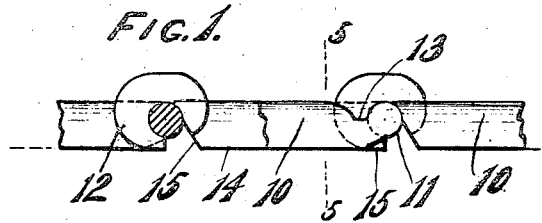
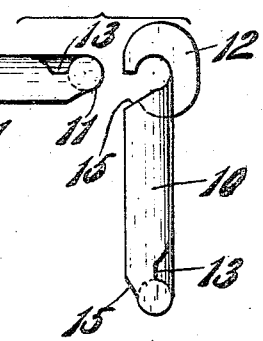
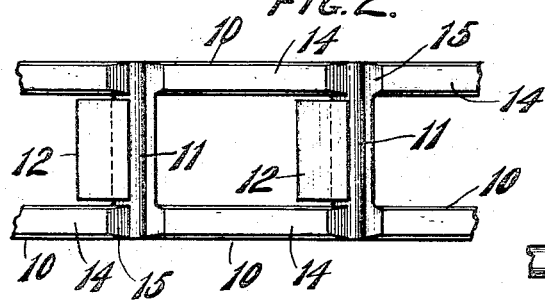
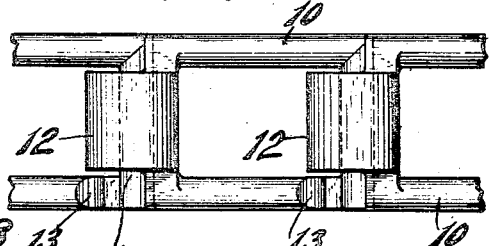
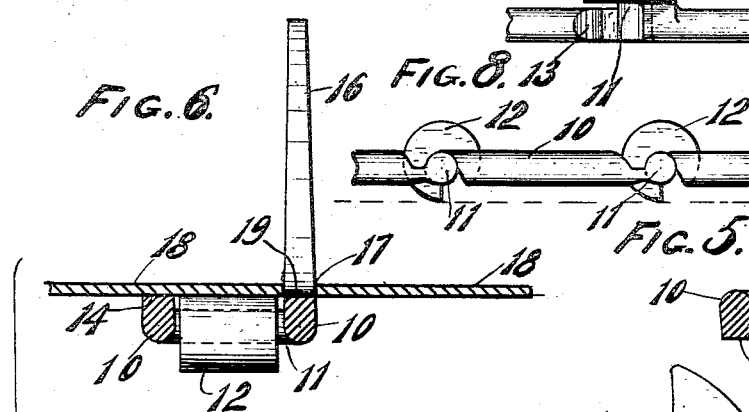
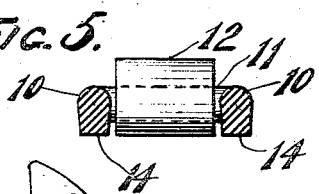
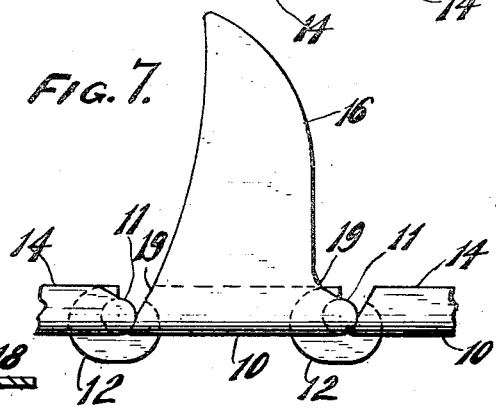
WITNESSES.
INVENTOR.
Frank Hamachek
By Benedict, Morsell & Caldwell
ATTORNEYS.

UNITED STATES PATENT OFFICE.

FRANK HAMACHEK, OF KEWAUNEE, WISCONSIN.

DETACHABLE-LINK CHAIN.

1,144,411.  Specification of Letters Patent.  Patented June 29, 1915.

Application filed October 3, 1910. Serial No. 584,963.

*To all whom it may concern:*

Be it known that I, FRANK HAMACHEK, a citizen of the United States, residing in Kewaunee, in the county of Kewaunee and State of Wisconsin, have invented new and useful Improvements in Detachable-Link Chains, of which the following is a description, reference being had to the accompanying drawings, which are a part of this specification.

This invention relates to improvements in detachable link chains of that type in which the chains are formed of a plurality of detachable links provided with coupling hooks adapted to engage the transverse bars of adjacent links.

In the ordinary detachable link chains the points of the coupling hooks of the links on the outer face of the chain project laterally beyond the side portions of the links and when the chains are used in conveyers the hook portions are necessarily drawn over the surfaces of the guides or supports and are subjected to considerable wear which tends to weaken the links and to cause the accidental separation thereof.

In the form of conveyers in which some of the links are provided with projections or flights which extend between suitable guide plates, the side edges of the outer faces of the links in alinement with the flight slot or space between the guide plates are necessarily positioned below the lower surface of said plates by the outer faces of the projecting coupling hooks of the links engaging the surface of the plates and consequently a space is formed which permits the grain or other material being handled to drop through the slot or to clog up the space.

It is one of the objects of this invention to obviate the before mentioned objectionable features and provide a chain of the character described which will be strong and durable and in which the outer face of the coupling hook will be almost entirely relieved of wear, and the improved chain will also serve to prevent material from dropping through the slots of the conveyer guide plates when used in connection with conveyers of this type.

With the above, and other objects in view, the invention consists of the chain and its parts and combinations as set forth in the claims, and all equivalents thereof.

In the accompanying drawing in which the same reference characters indicate the same parts in all of the views: Figure 1 is a side edge view of a portion of the improved chain, a part of one of the links being broken away and another link being shown in section; Fig. 2 is a top view of the links shown in Fig. 1; Fig. 3 is a bottom view thereof; Fig. 4 is a side edge view of two of the links positioned at right angles with relation to each other and separated to illustrate the manner of connecting and separating the links; Fig. 5 is a transverse sectional view of the chain taken on line 5—5 of Fig. 1; Fig. 6 is a transverse sectional view of the chain provided with flights or fingers which are shown as extending through the slots between conveyer guide plates; Fig. 7 is a side edge view of a portion of the chain shown in Fig. 6; and Fig. 8 is a side edge view, partly in section, of a fragment of chain of ordinary construction to clearly illustrate the difference existing between said chain and the improved construction.

Referring to the drawing the numeral 10 indicates the side portions, 11 the transverse hook engaging bar and 12 the coupling hook of a detachable chain link, a plurality of which are adapted to be coupled together in the ordinary manner by turning the links at an angle with relation to each other and sliding the coupling hooks laterally over the ends of the transverse hook engaging bars until they are in position to be turned to coupled position between the side portions of the links. One of the side portions of each link is notched as indicated by the numeral 13 to permit the point of the coupling hook to pass over the side portion of the link in coupling the links together.

The outer surfaces of the side portions 10 of the links are extended to form runners or slides 14, the wearing surfaces of which are in a plane substantially in alinement with the outer face of the coupling hook so that when drawn over a supporting surface the said outer faces of the coupling hooks will be relieved from wear.

The runners or slides are formed with angular ends 15 to permit the links to be turned at an angle with relation to each other in order to pass around sprocket wheels and to be connected together or separated. In the form of chain shown in Figs. 6 and 7 some of the links are provided with fingers or flights on their outer faces which are adapted to extend through slots 17 formed between guide plates 18 of conveyers of which they form a part. When used in connection with guide plates of this type the runners or slides also serve to substantially fill or block up the slots and prevent the material being moved from passing therethrough.

It will be noticed that the front and rear edges of the portions of the fingers or flights at their junction with the side portions of the links are inclined or curved outwardly or have fillet corners as indicated by the numeral 19 in order to cause any material which may drop into the slot 17 of the guide plates to ride up said inclined edges and drop to one side thereof.

From the foregoing description it will be seen that the chain is very simple in construction and when in use the runners will rest and slide on the supports therefor and relieve the outer faces of the coupling hooks from wear and thus obviate considerable wear therefrom, and when in use in connection with a conveyer is well adapted to perform the functions desired.

What I claim as my invention is:

1. The combination with conveyer slotted guide plates, of a chain therefor formed of links having side portions connected together at one end by a transverse hook engaging bar and at the other end by a coupling hook, the portions of the links on one side of the chain forming runner or slide portions which are approximately in alinement with the outer portions of the coupling hooks on the same side of the links, said runners or guides constructed to substantially fill or block up the slot of the guide plates when traveling between said plates.

2. The combination with conveyer slotted guide plates, of a chain therefor formed of links consisting of side portions connected together at one end by a transverse hook engaging bar and at the other end by a coupling hook, the portions of the links on one side of the frame forming runner or slide portions which are approximately in alinement with the outer portions of the coupling hooks on the same side of the links, said runner or guide portions constructed to substantially fill or block up the slot of the guide plates when used in connection therewith, and fingers or flights projecting from some of said runner portions, the edges of the portions of the flights at their junctions with the runner portions being inclined forwardly in the direction of travel of said chain to cause material to ride up thereon.

In testimony whereof, I affix my signature, in presence of two witnesses.

FRANK HAMACHEK.

Witnesses:
V. H. JANDA,
JOHN WALECKA, Jr.